United States Patent Office 2,971,972
Patented Feb. 14, 1961

2,971,972

ADDITION REACTION

Ben A. Bluestein, Schenectady, N.Y., assignor to General Electric Company, a corporation of New York No Drawing. Filed Mar. 30, 1959, Ser. No. 802,669

8 Claims. (Cl. 260—448.2)

This invention relates to a process for the preparation of β-cyanoethylphenyldichlorosilane. More particularly, this invention relates to the catalytic addition of phenyldichlorosilane to acrylonitrile in the presence of a catalyst composition consisting essentially of a trialkylamine and a cuprous compound selected from the class consisting of cuprous halides and cuprous oxide. This invention also relates to the catalyst composition per se.

Prior to the present invention, a number of methods have been suggested for the addition of various hydrolyzable silanes containing silicon-bonded hydrogen atoms to α,β-unsaturated olefinic nitriles. One method suggested for effecting this reaction is by the use of heat. This method, while producing addition products, is disadvantageous in two important respects. The thermal addition requires temperatures of from about 150° C. to 400° C. and at these temperatures acrylonitrile tends to undergo thermal polymerization. Furthermorme, the thermal addition of phenyldichlorosilane to acrylonitrile often results in the α-addition product. For example, the reaction between phenyldichlorosilane and acrylonitrile at a temperature of 200° C. and under autogenous pressure results in the formation of α-cyanoethylphenyldichlorosilane in very poor yield, with no detectable amount of the β-cyanoethylphenyldichlorosilane.

While α-cyanoethylphenyldichlorosilane is useful in a number of applications, it is of limited use in the preparation of organopolysiloxanes which must be subjected to both elevated temperatures and moist conditions. Under these conditions, the α-cyanoethyl group tends to hydrolyze, causing degradation of the organopolysiloxane. On the other hand, the silicon-bonded β-cyanoethyl radical is extremely resistant to hydrolysis and cleavage under hot, humid conditions, and finds particular use in the preparation of organopolysiloxanes which must be subjected to hot, humid conditions and which also must be used in contact with liquid hydrocarbons which have a severe swelling effect on conventional organopolysiloxanes such as methylpolysiloxanes and methylphenylpolysiloxanes. The cyanoalkyl group attached to silicon in organopolysiloxanes tends to stabilize these materials against swelling in such hydrocarbon materials.

Another method suggested for the addition of hydrolyzable silicon hydrides, such as phenyldichlorosilane to acrylonitrile, is to conduct the reaction in the presence of a peroxide catalyst. This method is also disadvantageous in that the reaction must, of course, be carried out under conditions under which the peroxide begins decomposing. Since this temperature is generally high enough to cause free radical polymerization of the acrylonitrile, it is found that this attempted addition results in the formation of large amounts of polymer rather than of addition product.

A very efficient and useful method for the addition of hydrolyzable silicon hydrides such as trichlorosilane to olefinic nitriles such as acrylonitrile is the method described and claimed in the copending application of Maurice Prober, Serial No. 401,702, filed December 31, 1953, and assigned to the assignee of the present invention. By the method of this Prober application, it is possible to produce materials such as β-cyanoethyltrichlorosilane in high yield by the reaction of trichlorosilane and acrylonitrile in the presence of a tertiary amine catalyst, such as a trialkyl amine or various heterocyclic tertiary amines. However, while the tertiary amine catalyzed addition reaction of the aforementioned Prober application is very useful for the preparation of trifunctional materials, such as β-cyanoethyltrichlorosilane, the Prober process is commercially unattractive for the preparation of difunctional silanes, such as β-cyanoethylphenyldichlorosilane, because of a very slow reaction rate and because of the relatively poor yield of product. Thus, when one reacts phenyldichlorosilane with acrylonitrile in the presence of a tertiary amine such as tributylamine, the reaction product contains only a few percent of β-cyanoethylphenyldichlorosilane.

A very efficient and commercially attractive process for the addition of hydrolyzable silicon hydride to olefinic nitriles is described and claimed in my copending application, Serial No. 783,102, filed December 29, 1958, and assigned to the same assignee as the present invention. By this method, a material such as β-cyanoethylphenyldichlorosilane can be prepared by effecting reaction between phenyldichlorosilane and acrylonitrile in the presence of either a two-component catalyst system comprising a cuprous compound selected from the class consisting of cuprous halides and cuprous oxide, and an aliphatic diamine, or in the presence of a three-component catalyst system comprising the aforementioned two components as well as a trialkyl amine. While the process of my copending application is commercially useful, it is noted that both of the catalyst compositions contain a diamine such as tetramethylethylene diamine. These diamines are relatively expensive materials in relation to the other components of the catalyst system, and thus present some economic disadvantage to the practice of the invention of my aforementioned copending application in those reactions which can be effected satisfactorily without the use of such a diamine.

The present invention is based on my discovery that the specific reaction between phenyldichlorosilane and acrylonitrile can be effected in reasonable yield to form β-cyanoethylphenyldichlorosilane without the necessity for employing a diamine. This reaction is unique in that the attempted reaction of phenyldichlorosilane and acrylonitrile in the presence of a cuprous halide or cuprous oxide alone fails to produce any trace of the desired addition product, β-cyanoethylphenyldichlorosilane. Furthermore, the attempted reaction of a material such as methyldichlorosilane with acrylonitrile in the presence of both cuprous chloride and a trialkyl amine such as tributylamine yields only a few percent of the desired β-addition product.

The trialkyl amine, which is one of the components of the catalyst system of the present invention, is preferably a trialkyl amine in which the alkyl radicals are lower alkyl radicals, e.g., alkly radicals containing from 1 to 8 carbon atoms. These trialkyl amines can be described broadly by the following formula:

(1) 

where R is an alkyl radical, preferably a lower alkyl radical containing from 1 to 8 carbon atoms. Among the many trialkyl amines within the scope of Formula 1 can be mentioned, for example, trimethylamine, triethylamine, tributylamine, trioctylamine, methyldiethylamine, dimethylbutylamine, methlybutyloctylamine, dimethyloctadecylamine, etc.

The cuprous compound employed in the catalyst system of the present invention includes cuprous oxides, cuprous chloride, cuprous bromide, cuprous iodide, and cuprous fluoride, with the preferred specific cuprous compound being cuprous chloride.

In carrying out the process of the present invention, the relative amounts of the reactants phenyldicholorsilane and acrylonitrile and the catalyst composition may be varied within extremely wide limits. However, since the reaction of the phenyldichlorosilane with the acrylonitrile involves one mole of each of the reactants, it is preferred to use these reactants on a nearly equimolar basis, for example from 0.5 to 1.5 moles of phenyldichlorosilane per mole of acrylonitrile. However, the use of a tenfold excess of either reactant is not precluded, although no benefits are derived therefrom. The two components of the catalyst system may vary with each other and with the reactants over a wide range. In general, the catalyst composition is employed in an amount of from 0.1 to 20 mole percent of the cuprous compound selected from the class consisting of cuprous oxide and cuprous halide, and from 0.1 to 20 mole percent of the trialkyl amine within the scope of Formula 1, the foregoing mole percent being based on the total number of mols of acrylonitrile and methyldichlorosilane employed in the reaction mixture.

While the broad ranges of the components of the catalyst system have been described above, the optimum catalyst composition comprises, on the basis of the total number of moles of phenyldichlorosilane and acrylonitrile, from 1 to 10 mole percent each of the cuprous compound and the trialkyl amine within the scope of Formula 1.

Since the ratio of the two components in the catalyst composition per se is the same as the ratio employed in carrying out the reaction of the present invention, it is obvious that the catalyst composition comprises on a mole ratio basis from 0.1 to 20, and preferably from 1 to 10, moles of cuprous compound selected from the class consisting of cuprous oxides and cuprous halides, and from 0.1 to 20, and preferably from 1 to 10, moles of trialkyl amine within the scope of Formula 1.

In carrying out the process of the present invention, the ratio of the various components of the catalyst composition to each other may vary within wide limits and the various components of the reaction mixture may be added to the reaction vessel in any desired order. No adverse effect has been observed by varying the order of addition of any of the components. Since the reaction mixture is a heterogeneous mixture, it is desirable to agitate the reaction mixture to obtain optimum reaction rates. However, agitation is not critical to the successful completion of the reaction. One of the most useful methods of agitating the reaction mixture is by heating the mixture at its reflux temperature until the reaction is completed. Gentle refluxing of the reaction mixture provides suitable agitation and optimum reaction rates and yields. Generally, the temperature of the reaction mixture varies during the course of the reaction and varies also depending on the particular components of the catalyst system and on the concentration of the components of the catalyst system. Generally, the reflux temperature during reaction is from about 50° C. to about 200 to 225° C.

In addition to refluxing of the reaction mixture under atmospheric conditions, the reaction mixture may be heated at the reflux temperature corresponding to reduced pressures or elevated pressures. Thus, with low reaction pressures, the reaction temperature may be as low as 30 to 40° C. At higher pressures, the reflux temperature will increase correspondingly, for example to a temperature of from about 225 to 250° C. While increasing the pressure and reflux temperature increases the reaction rate somewhat, the most economical conditions for effecting the reaction are atmospheric pressure in conventional equipment rather than in the high-pressure equipment required for higher pressure operation. It should also be understood that the reaction of the present invention may be effected by placing the reactants in a pressure vessel and heating the contents of the vessel to an elevated temperature with or without providing additional agitation. In addition to conducting the reaction at reflux temperature, the reaction will also proceed at temperatures as low as room temperature, i.e., a temperature of around 20° C. with or without agitation, but the reaction rate is slow under these conditions.

The reaction of the present invention may also be effected in either the presence or the absence of additional inert solvents. In a preferred embodiment of my invention, no solvent is employed. However, the use of solvents which are inert under the reaction conditions is not precluded. Such solvents include, for example, acetonitrile, and adiponitrile. No particular advantage is derived from the use of solvent in the reaction.

From the foregoing discussion, it is seen that the reaction of the present invention is effected by merely adding the phenyldichlorosilane, the acrylonitrile, the cuprous compounds, and the trialkylamine to a suitable reaction vessel and maintaining the temperature at the desired level for the time necessary to complete the reaction. The time required to complete the reaction varies according to a number of factors, such as the particular reactants involved, the temperature of the reaction, the concentration of the catalyst and the nature of the catalyst. Generally, however, when each of the catalyst components is present in an amount of from 1 to 10 mole percent based on the total number of moles of phenyldichlorosilane and acrylonitrile, complete reaction is effected at reflux temperature and atmospheric pressure in from 24 to 48 hours.

After completion of the reaction, the β-cyanoethylphenyldichlorosilane can be recovered from the reaction mixture by any number of methods. One method comprises fractional distillation of the reaction mixture and collection of the β-cyanoethylphenyldichlorosilane fraction. Another method comprises cooling of the reaction mixture to room temperature and subsequently bubbling dry hydrogen chloride therethrough to form the hydrochloride of the trialkylamine. This hydrochloride precipitates from the reaction mixture and, after filtration of the precipitate, the filtrate is fractionally distilled to isolate the β-cyanoethylphenyldichlorosilane.

In order that those skilled in the art may better understand how the present invention may be practiced, the following examples are given by way of illustration and not by way of limitation.

*Example 1*

To a reaction vessel was charged a mixture of ingredients in the ratio of 20 moles of phenyldichlorosilane, 15 moles of acrylonitrile, 2.0 moles of tributylamine, and 2.0 moles of cuprous chloride. This reaction mixture was heated at its reflux temperature for 38 hours, during which time the reflux temperature rose from about 50° C. to 190° C. At the end of this time, the reaction mixture was fractionally distilled and the β-cyanoethylphenyldichlorosilane was collected at 140° to 160° C. at 8 mm. The identity of the β-cyanoethylphenyldichlorosilane was confirmed by infrared analysis. The total amount of β-cyanoethylphenyldichlorosilane recovered corresponded to a conversion of 25% based on the limiting reactant, acrylonitrile. When the procedure of this example was repeated, except that no trialkylamine was employed in the catalyst composition, no detectable amount of β-cyanoethylphenyldichlorosilane was obtained. When the procedure of this example was repeated, employing tributylamine alone without the cuprous chloride, only a few percent of β-cyanoethylphenyldichlorosilane was obtained.

*Example 2*

When the procedure of Example 1 is repeated, employing equal molar amounts of phenyldichlorosilane and acrylonitrile, with 1 mole percent each of triethylamine and cuprous oxide, the mole percents being based on the total number of moles of phenyldichlorosilane and acrylonitrile, a conversion of about 20 percent of the starting materials to β-cyanoethylphenyldichlorosilane is obtained after refluxing the reaction mixture for 36 hours.

*Example 3*

When the procedure of Example 1 is repeated employing equimolar amounts of acrylonitrile and phenyldichlorosilane with 10 mole percent each of cuprous bromide and trioctylamine, said mole percents being based on the total number of moles of phenyldichlorosilane and acrylonitrile, approximately 30 percent conversion of the starting materials to β-cyanoethylphenyldichlorosilane is obtained after refluxing the reaction mixture for 24 hours.

*Example 4*

When the procedure of Example 1 is repeated employing 100 moles of phenyldichlorosilane, 10 moles of acrylonitrile, one mole trimethylamine, and 0.1 mole cuprous chloride, a conversion of the limiting reactant, the acrylonitrile, to β-cyanoethylphenyldichlorosilane, in amount corresponding to about 20 percent, is obtained after refluxing for 40 hours.

While the foregoing examples have been directed to only a few of the catalyst composition variables of the present invention, it should be understood that the process of the present invention involves broadly the reaction of phenyldichlorosilane with acrylonitrile to form β-cyanoethylphenyldichlorosilane with a catalyst composition consisting essentially of a cuprous compound selected from the class consisting of cuprous oxide and cuprous halides, and a trialkylamine within the scope of Formula 1. The components of the catalyst may be varied within the ranges previously described.

The β-cyanoethylphenyldichlorosilane which is prepared by the process of the instant invention is particularly useful in the preparation of organopolysiloxane elastomers which are to be subjected to environments which contain hydrocarbon solvents and which must be subjected to warm, moist conditions. For example, β-cyanoethylphenyldichlorosilane can be converted to a gum by mixing one part of the β-cyanoethylphenyldichlorosilane with 10 parts of dimethyldichlorosilane and slowly adding this mixture to 10 parts by weight of diethyl ether and 10 parts by weight of ice water. After thoroughly agitating the reaction mixture, it is allowed to separate into two phases, the top phase of which is an oil layer. This oil layer is separated and consists of a hydroxy chain-stopped silicone fluid containing recurring β-cyanoethylphenylsiloxane units and dimethylsiloxane units. This fluid is converted to a gum by mixing the fluid with potassium hydroxide in the ratio of 30 parts of peroxide per million parts of the fluid. After heating this mixture at a temperature of about 150° C. for six hours, a gum having a viscosity in excess of 1,000,000 centipoises is obtained. 100 parts by weight of this gum is then milled with 40 parts by weight of finely divided silica and three parts by weight of benzoyl peroxide. The resulting material is cured in a mold at 150° C. for 15 minutes and is then aged in a hot air oven at 200° C. for 24 hours to produce a silicone rubber which is characterized by all of the desirable features of conventional silicone rubbers and which have the additional feature of superior resistance to swelling in hydrocarbon solvents. For example, the gum described above exhibits less than one-half the swell of a conventional dimethyl silicone elastomer when soaked in toluene for one hour.

What I claim as new and desire to secure by Letters Patent of the United States is:

1. A method of forming β-cyanoethylphenyldichlorosilane which comprises contacting phenyldichlorosilane with acrylonitrile in the presence of a catalyst composition consisting essentially of a cuprous compound selected from the class consisting of cuprous oxide and cuprous halides, and a trialkylamine, both the cuprous compound and the trialkylamine being present in an amount equal to from 0.1 to 20 mole percent based on the total number of moles of phenyldichlorosilane and acrylonitrile.

2. The method of claim 1 in which the trialkylamine is tributylamine.

3. The method of claim 1 in which the cuprous compound is cuprous chloride.

4. The process of forming β-cyanoethylphenyldichlorosilane which comprises contacting phenyldichlorosilane with acrylonitrile in the presence of from 0.1 to 20 mole percent cuprous chloride and from 0.1 to 20 mole percent tributylamine, said mole percent being based on the total number of moles of phenyldichlorosilane and acrylonitrile.

5. A catalyst composition consisting essentially of ingredients in the ratio of from 0.1 to 20 moles of a trialkylamine and from 0.1 to 20 moles of a cuprous compound selected from the class consisting of cuprous oxide and cuprous halides.

6. The catalyst composition of claim 5 in which the trialkylamine is tributylamine.

7. The catalyst composition of claim 5 in which the cuprous compound is cuprous chloride.

8. A catalyst composition consisting essentially of ingredients in the ratio of from 0.1 to 20 moles of tributylamine and from 0.1 to 20 moles of cuprous chloride.

References Cited in the file of this patent

UNITED STATES PATENTS

| | | |
|---|---|---|
| 2,161,645 | Vollman et al. | June 6, 1939 |
| 2,762,791 | Pease et al. | Sept. 11, 1956 |

FOREIGN PATENTS

| | | |
|---|---|---|
| 786,020 | Great Britain | Nov. 6, 1957 |
| 1,118,500 | France | Mar. 19, 1956 |